United States Patent [19]

Miller et al.

[11] 3,844,132
[45] Oct. 29, 1974

[54] PRODUCE COOLER AND METHOD OF COOLING PRODUCT

[75] Inventors: Hugo Miller; Floyd E. Miller, both of Fremont, Calif.

[73] Assignee: Inter Process Corporation, Burlingame, Calif.

[22] Filed: Sept. 14, 1973

[21] Appl. No.: 397,291

[52] U.S. Cl.............................. 62/268, 62/64, 62/100
[51] Int. Cl............................................. F25b 19/00
[58] Field of Search....... 62/268, 100, 64, 169, 170, 62/270

[56] References Cited
UNITED STATES PATENTS

| | | | |
|---|---|---|---|
| 2,080,103 | 5/1937 | Zarotschenzeff | 62/64 |
| 2,996,898 | 8/1961 | Hosken | 62/268 |
| 3,091,098 | 5/1963 | Bowers | 62/268 |
| 3,192,643 | 7/1965 | Rieutord | 62/100 X |
| 3,604,217 | 9/1971 | Spear | 62/100 |

*Primary Examiner*—William J. Wye
*Attorney, Agent, or Firm*—Lothrop & West

[57] ABSTRACT

A produce cooler includes a vacuum chamber connected to a vacuum pump and receiving cars for supporting produce inside the chamber. A spray in the chamber discharges water over the produce while the chamber is under subatmospheric pressure. Condensible vapors arising from the produce and from the sprayed water are condensed by a refrigerated coil in the chamber above the spray and drop onto the produce. Water running over the produce to the bottom of the chamber is recirculated to the spray. The method for cooling produce includes simultaneously subjecting the produce to vacuum and to a drenching by liquid water from a sump as well as by condensed vapors emanating from the water and from the produce.

6 Claims, 1 Drawing Figure

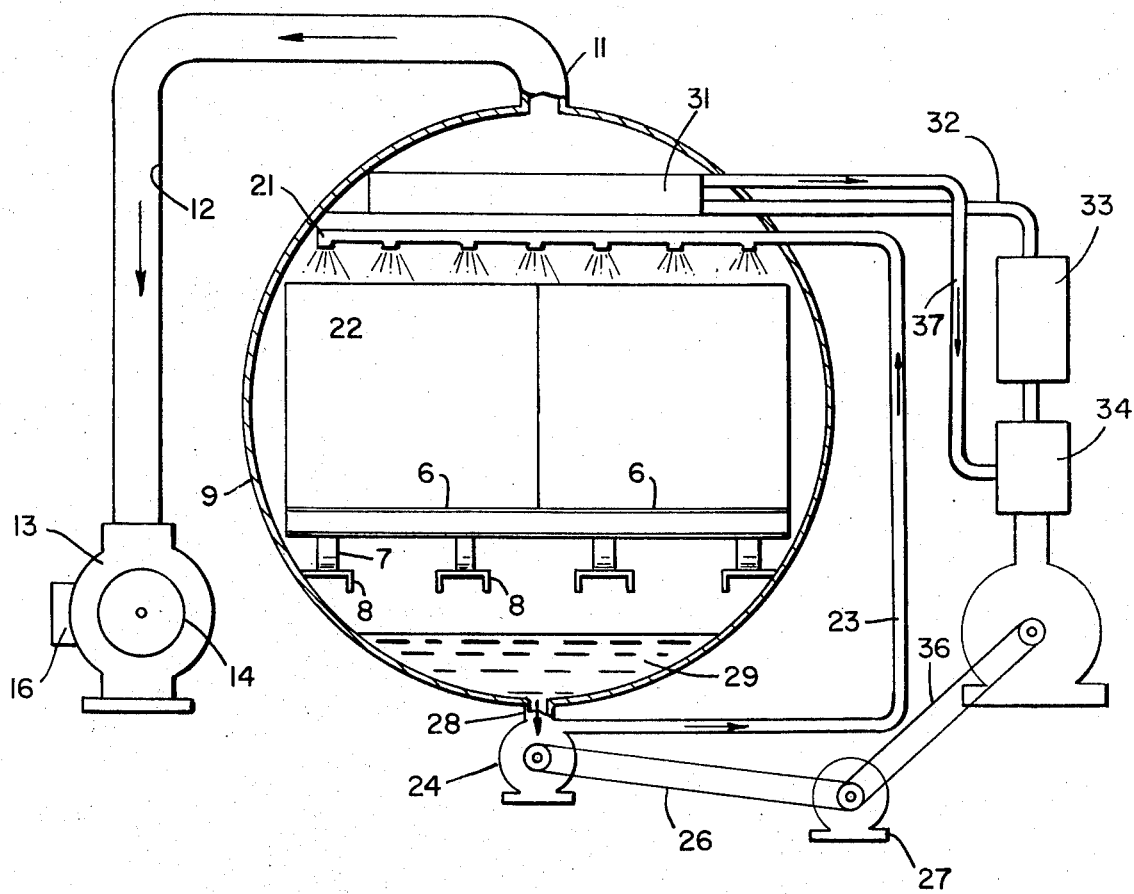

PRODUCE COOLER AND METHOD OF COOLING PRODUCT

It has been customary to cool certain produce, such as relatively damp lettuce; for example, for preservation and shipment by placing the lettuce in a chamber and evacuating the chamber. Water so evaporated from the surface of the lettuce takes its heat of vaporization from the lettuce thus dropping the lettuce temperature to a suitable low value for long preservation. It is likewise customary to cool some other produce; for example, celery by drenching the celery with a supply of refrigerated water very near the freezing point, thus transferring the field heat from the celery to the circulated water. Both of these systems are commercially effective and do in fact reduce the temperature of the produce sufficient for storage or shipment but both of them have a number of disadvantages or drawbacks. Among these are the relatively large size of equipment necessary and in some cases the relatively high cost of so withdrawing the field heat. It is also true that one apparatus designed for effectuating cooling of one product, such as lettuce, is not usually useful in treating another product, such as celery. Additionally, there are other field crops which are becoming economically suitable for cooling and comparable refrigeration treatment prior to storage and shipment. But the equipment available and the treatment processes utilized have not yet been adapted thereto.

It is therefore an object of our invention to provide a produce cooler which can easily be adapted for use with various different products.

Another object of the invention is to provide a produce cooler in which the time of treatment and thus the cost of the equipment and the cost of its operation are substantially reduced.

Another object of the invention is to provide a produce cooler in which the treatment mechanism is compactly and economically arranged.

A further object of the invention is in general to provide an improved treatment apparatus and process for cooling produce.

Other objects, together with the foregoing, are attained in the embodiment of the invention described in the accompanying description and illustrated in the accompanying drawing, in which:

The FIGURE is a diagram showing schematically and approximately in cross-section on a vertical, transverse plane an appropriate apparatus for cooling produce and by which the method of the invention can be accomplished.

In a typical instance the produce containing field heat and to be treated may be lettuce or more particularly celery which is cut or harvested and is positioned in the form of heads or in the form of bunches in ventilated cartons stacked several wide and several high on a van or cart 6 supported by wheels 7 running on rails 8 extending from outside into the interior of a vacuum tube 9. Usually the produce is packed in individual, ventilated packages once of wood and now of fiberboard. These are stacked on the carriages 6 in appropriate layers. The vacuum chamber 9 is conveniently constructed of metal adequate to permit a substantial subatmospheric interior pressure. The chamber is customarily provided with an end door or doors so that the interior of the chamber can be charged by rolling in the laden carts 6 when the doors are opened. When the lading is in position within the tube the interior can be isolated from the atmosphere by closure of the doors.

The closed chamber 9 is evacuated or submitted to a subatmospheric pressure. A connection 11, preferably at the upper inlet portion thereof, is joined through a duct 12 to a standard, commercial vacuum pump 13 customarily driven by an electric motor 14 and having an outlet 16 discharging to the air at any convenient point. When the chamber 9 is closed, operation of the vacuum pump 13 is effective to reduce the pressure within the chamber. The pressure reduction occurs gradually since much of the surface moisture on the introduced produce initially evaporates forming water vapor drawn off by the pump 13. The evaporation absorbs field heat from the produce and so at least partially cools the produce.

Pursuant to the present invention, the foregoing operation is substantially augmented. Arranged over the resting position of the produce carriages in the chamber 9 is a water manifold 21 having a plurality of spray nozzles 22 thereon. The nozzles are connected through a pressure pipe 23 to a water pump 24 appropriately driven by a belt 26 from an electric motor 27. The water pump is supplied from any suitable source and particularly is arranged to have an inlet duct 28 communicating with a sump 29 which is primarily the bottom portion of the chamber 9.

When the water pump is driven water is circulated from the at least partially filled sump 29 through the duct 23 to discharge from the nozzles 22 and to spray or fall downwardly over produce on the cars 6. Water thus drenches, travels down or flows over the produce and eventually finds its way back to the sump 29 for recirculation. Relatively warm water subject to the subatmospheric pressure within the chamber 9 tends to vaporize at the sump surface, at the sprays and from the surface of the produce. The vapor, being light, tends to rise.

Vapor from the water derived from the sump 29 is in addition to vapor resulting from entrained or surface water, such as dew or the like, which enters the vacuum chamber with the produce. Water vapor from whatever source tends to rise toward the fitting or connection 11. In doing so it comes into contact with and passes over a refrigeration coil 31 disposed in the upper part of the chamber 9 between the pressure pipe 23 and the connection 11.

The condenser coil 31 or heat exchanger is supplied with cold refrigerand from a pipe 32 emanating from a mechanical refrigerator mechanism 33. This is included with a refrigeration compressor 34 also driven by a belt 36 from the motor 27 or by another, separate motor. The refrigerant from the pipe 32 entering the coil 31 is effective to remove heat from the rising or passing water vapor and is effective to condense such vapor into water droplets. These fall by gravity and with the water spray from the nozzles onto and through the produce on the cars 6 to arrive, eventually, in the sump 29. Any gasses in the water or emanating from the produce that are non-condensible by the coil 31 continue to rise past the coil to the connection 11 and thus are drawn off and discharged through the vacuum pump 13. Refrigerant warmed by the act of condensing the water vapor returns through a pipe 37 to the condenser 34 and the refrigeration mechanism 33 for recirculation.

In accordance with this arrangement the produce is cooled not only by evaporation of whatever water may be initially entrained thereon but is also cooled by a shower of additional water from the sump and by the cold condensate from previously vaporized water. There is a liquid-produce contact of substantial magnitude. This accelerates the process of heat transfer from the produce to the recirculated water and to the condensed water vapor. In fact, the cooling time for a given load of produce containing a known amount of field heat is in practice cut substantially in half over a vacuum cooling arrangement in which there is no spray and no condensation of water vapor.

The process includes the steps of evacuating the produce not only to evaporate initially entrained water therefrom in order to withdraw field heat from the produce but also of condensing much of that water vapor by refrigeration and returning such condensate together with a spray of additional and recirculated water to the produce for thermal contact therewith.

What is claimed is:

1. A produce cooler comprising a vacuum chamber, means in said chamber for supporting produce therein, means for pumping out said chamber to provide a vacuum therein, means in said chamber for discharging water into said vacuum in said chamber at a point above said produce and from which said water is free to run by gravity over produce supported in said chamber, and means in said chamber for mechanically refrigerating water vapor therein and condensing said water vapor in said vacuum at a location above said produce and from which said condensed water vapor is free to run by gravity over produce supported in said chamber.

2. A produce cooler as in claim 1 including a sump in said chamber for catching water draining from said produce, and means for circulating water from said sump to said discharging means.

3. A produce cooler as in claim 1 in which said evacuating means includes a connection to said chamber at the top thereof, said discharging means includes a spray between said produce supporting means and said connection, and said mechanically refrigerating means includes a condenser coil between said spray and said connection.

4. A produce cooler as in claim 3 in which said spray and said coil are both disposed over said produce supporting means.

5. A produce cooler as in claim 3 in which said sump is below said spray and said coil.

6. A produce cooler as in claim 1 including means for operating said refrigerating means and said water discharging means simultaneously.

* * * * *